Jan. 11, 1938.   O. A. BAKER   2,104,966
PARACHUTE
Filed Nov. 27, 1935
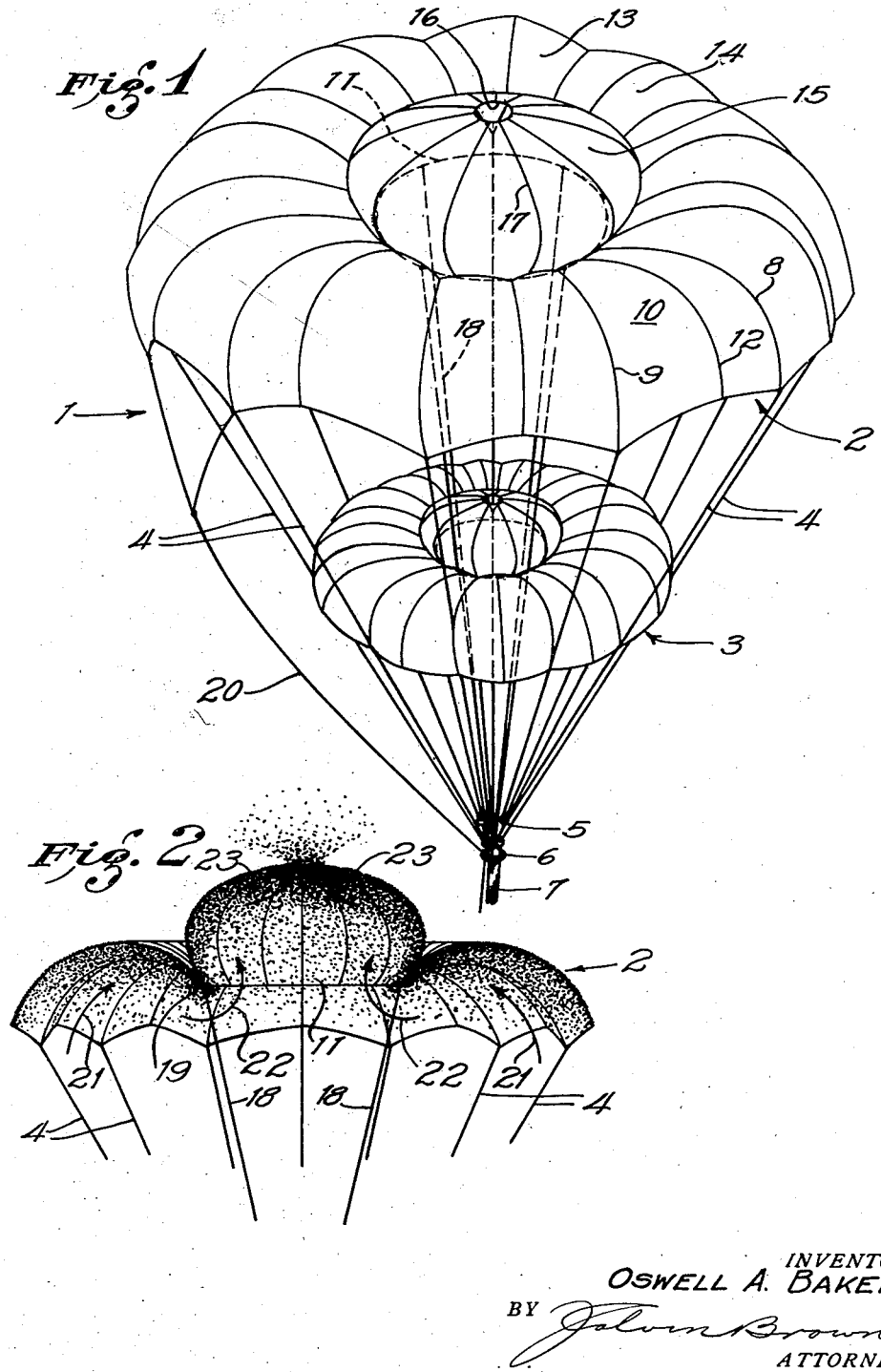
INVENTOR
OSWELL A. BAKER
BY
ATTORNEY Patented Jan. 11, 1938

2,104,966

UNITED STATES PATENT OFFICE 2,104,966

PARACHUTE

Oswell A. Baker, San Gabriel, Calif.

Application November 27, 1935, Serial No. 51,768

2 Claims. (Cl. 244—145)

This invention relates to parachutes, and has for an object the provision of a parachute adapted to allow safe descent from an altitude of packages and persons without appreciable drift, and with a high factor of safety.

An object of the invention is the provision of a parachute wherein the "spilling" of air therebeneath is regulated in a novel manner.

Another object is the provision of a parachute having its parts so constructed that air pressure therebeneath is controlled, to the end that oscillation, in a large measure, is overcome.

This invention contemplates an improvement upon my Ventilated parachute, United States Letters Patent No. 1,714,753, granted May 28, 1929.

I have found that oscillation, drift, rate of descent, rapidity of opening of the parachute, and safety without tear of the canopy or canopies may, in a large measure, be controlled by the provision of a certain construction contemplated by the present invention by the expediency of so constructing the canopies that air under pressure therebeneath is directed as to its "spill" toward a novel member adapted to vent said air in regulated amounts.

The object of the invention is to attain the desired characteristics just set forth.

A further object of the invention is the provision of a parachute not requiring an expert to pack the same.

Further objects include a parachute which is simple in construction, fool proof and efficient in operation, does not require a pilot chute, is compact, inexpensive in cost of manufacture, easily steerable, affords a maximum factor of safety, opens quickly, and is generally superior to parachutes now known to the inventor.

The drawing illustrates an embodiment of the invention, and wherein—

Figure 1 is a perspective view of the parachute as an entirety, and

Figure 2 is a cross sectional view of one of the canopies, both views illustrating the parachute in position of descent.

In the drawing, the improved parachute is designated as an entirety by the numeral 1, and wherein I have provided two canopies 2 and 3. Both canopies are identical in construction, the difference lying as to the relative size, the canopy 2 being larger than the canopy 3, and it is intended that said canopies should act in conjunction with each other, the canopy 3 being spaced below the canopy 2 at a determined distance and parallel therewith. As both canopies are identically constructed, one thereof will be described, the same references or letters applying to the other. The canopies 2 and 3 are joined together along their margins by cordage or shroud lines 4, these shroud lines continuing below the canopy 3 and secured to rings 5, and in turn the rings 5 are secured by suitable cordage to a main ring 6. The lift webs, harness or the like 7, in turn, are secured to the ring 6. It is customary in parachute construction to attach the shroud lines at marginal points of the canopy and to thereafter continue the shroud lines through the canopy to the apex thereof. In the present instance, the shroud lines, considering the canopy 2, are attached to the marginal edges of the canopy and then are secured to the canopy, as shown at 8 and 9 for two of said shroud lines, the space between said portions 8 and 9 forming what is called a panel or section 10. For convenience of description, the portion of the shroud lines contemplated by portions 8 and 9 will be termed the cordage. This canopy is formed with an enlarged central opening 11 and the cordage is secured to the canopy adjacent said opening in any approved manner. It will be observed that between the cordage 8 and 9 is further cordage 12 extending between the margin of the canopy and the central opening. However, no shroud line connects with this cordage. The construction is such that when pull is exerted upon the shroud lines connected with the cordage 8 and 9, the air pressure beneath the canopy will cause the panel 10 to be trough-like with respect to the under surface of the panel. The top of the canopy appears to be annularly sinuous in form, as for instance, the canopies at 13 and 14.

Adapted to be secured over the central opening 11 is a member 15 which, when in position of service, is bulbous in form and provided with a central vent opening 16. The usual cordage 17 may be secured to the fabric of this bulbous member for the purpose of reenforcing the same, and likewise securing the member to its canopy.

In order to maintain the configuration of the canopies and likewise the bulbous domes, I have provided inner shroud lines 18 secured to the meeting zone 19 between the canopies and the marginal edge of the domes. These shroud lines 18 continue downwardly and are secured to the rings 5. At 20, I have provided a line secured at marginal points to the canopy 2, which line may be used by the aeronaut for the purpose of steering or collapsing one of the canopies during descent of the parachute.

The operation, uses and advantages of the parachute described are as follows:

Referring to Figure 2, it will be observed that the bulbous dome member is relatively large with respect to the panels of the canopy. The intention is that air during descent of the parachute, be compressed beneath the panels and likewise within the bulbous dome, in such a manner as to force the air under pressure through the vent openings 16. The arrows 21, 22, 23 indicate the general air flow beneath the canopy and the grouping of the dots is intended to illustrate the degree of air compression. For instance, the air is under great compression at the zone of the arrows 23 and within the bulbous dome. The construction of the sections or panels by providing troughs or channels permits air to be compressed within each trough or channel. This air under compression steadily flows toward the opening 11 and into the bulbous dome with the result that the parachute descends steadily without appreciable oscillation or drift.

The use of two canopies has been found advantageous in that the parachute canopies may be of small diameter, both canopies carrying their proportion of load. The upper canopy carries the major portion of the load while the lower canopy has been found to act as a shock absorber when the parachute first opens, and further acts to draw all of the shroud lines into place during such opening action of the parachute.

It will be seen that the parachute is so constructed as to take advantage of a controlled compression of the air beneath the canopies and within the bulbous dome members; that by regulating the size of the bulbous dome, back pressure of air which would cause a "spill" over the marginal edges of the canopy is prevented, and by preventing this "spill", oscillation of the parachute is overcome.

I claim:

1. In a parachute, two spaced-apart canopies, both provided with central openings, a bulbous member secured over each of said central openings and to said canopies, shroud lines extending between said canopies; both said canopies provided with panels, and the said shroud lines being secured to one of said canopies at alternate panels.

2. In a parachute, two spaced-apart canopies, both provided with central openings, a bulbous member secured over each of said central openings and to said canopies, shroud lines extending between said canopies; both said canopies provided with panels, the said shroud lines being secured to one of said canopies at alternate panels; shroud lines secured to the marginal edge of said bulbous members, and means for securing all the shroud lines together at a zone remote from the canopies.

OSWELL A. BAKER.